United States Patent [19]

Andrews

[11] Patent Number: 4,951,155
[45] Date of Patent: Aug. 21, 1990

[54] APPARATUS AND METHOD FOR SYNCHRONIZING VIDEODISC IMAGES WITH AUDIO SIGNALS

[75] Inventor: Carlton A. Andrews, Austin, Tex.
[73] Assignee: Stokes Imaging Services, Austin, Tex.
[21] Appl. No.: 124,761
[22] Filed: Nov. 23, 1987
[51] Int. Cl.[5] ............................................. G11B 7/00
[52] U.S. Cl. .................................. 358/342; 360/14.1; 360/35.1; 360/34.1; 360/72.1
[58] Field of Search ................. 360/79, 80, 72.2, 13, 360/72.2, 14.1, 33.1, 19.1; 358/342, 341, 343; 369/83, 48–50

[56] References Cited

U.S. PATENT DOCUMENTS

| | | | |
|---|---|---|---|
| 4,338,644 | 7/1982 | Staar | 360/72.2 |
| 4,353,096 | 10/1982 | Broadbent | 358/342 |
| 4,394,745 | 7/1983 | Menezes | 360/72.2 |
| 4,449,198 | 5/1984 | Kroon | 360/72.2 |
| 4,602,296 | 7/1986 | Muraroshi | 358/335 |
| 4,703,368 | 10/1987 | Dakin | 360/72.2 |

Primary Examiner—Robert L. Richardson
Attorney, Agent, or Firm—J. Nevin Shaffer, Jr.; Russell D. Culbertson

[57] ABSTRACT

An audio/videodisc synchronizer accepts random access frame numbers and records digital ques on one track of a magnetic tape. Other tape tracks are available and are used for recording audio or for synchronization of other videodiscs. When the digital ques are played back through the synchronizer, a videodisc player is controlled through its computer interface. As a result, by use of ordinarily available components, virtually unlimited audio is available per still video frame. The device of the present invention provides for remastering of the program audio independent of the videodisc source and thereby eliminates the need for video frames with audio to be recorded on the videodisc in the same sequential order in which they will be played, when continuous audio is required, and allows video frames to be removed or added into an existing presentation. Importantly, the present invention allows a user to fully utilize the large storage potential of videodiscs, currently 54,000 frames per side, for smaller presentations by allowing the audio source to select the video frames to be viewed. This means that one videodisc could hold hundreds or thousands of various video presentations and the user could have many audio tapes corresponding to a single videodisc.

12 Claims, 4 Drawing Sheets

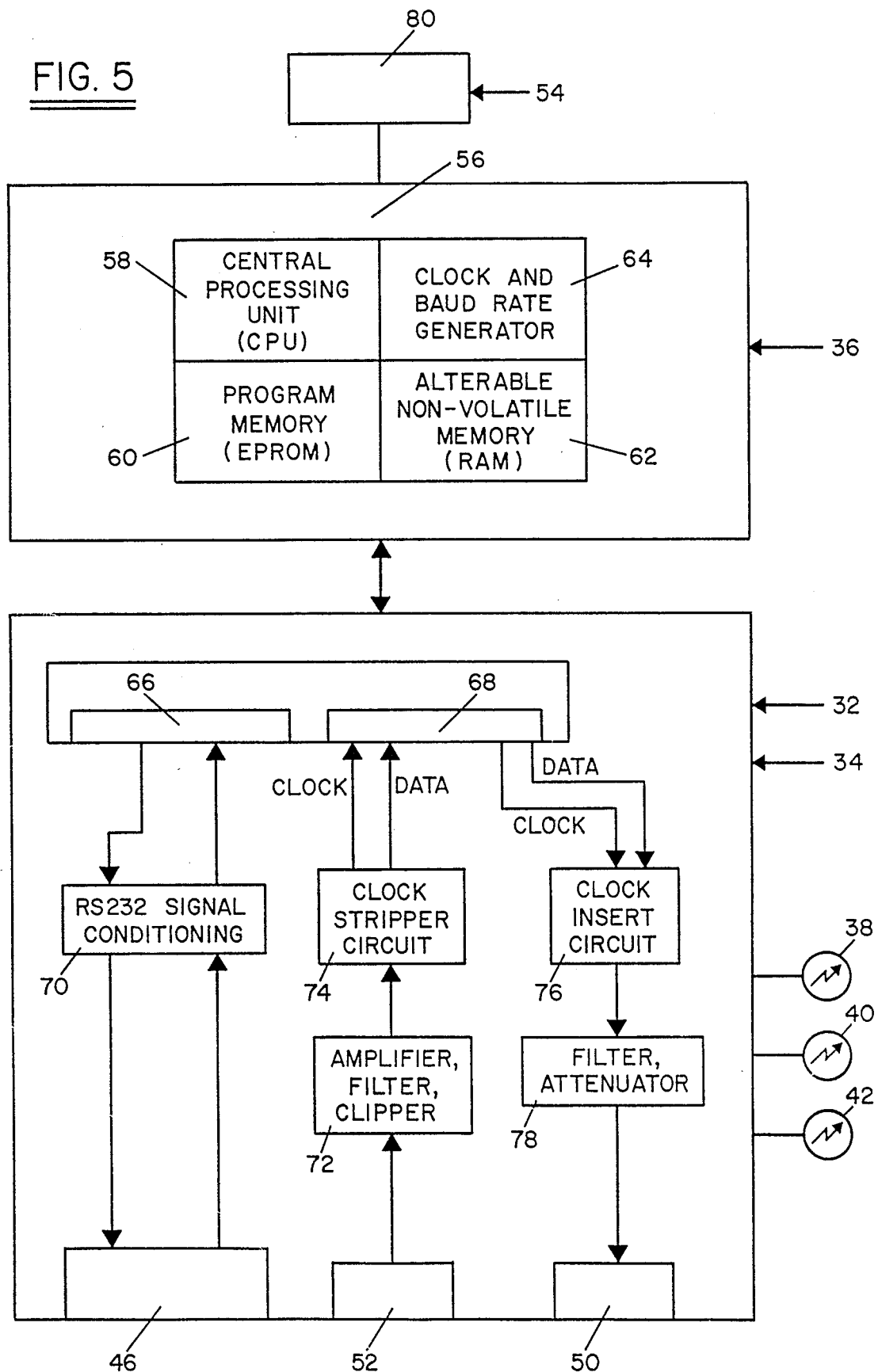

APPARATUS AND METHOD FOR SYNCHRONIZING VIDEODISC IMAGES WITH AUDIO SIGNALS

BACKGROUND OF THE INVENTION

This invention relates to an improved audio/videodisc synchronizer for presenting still frame audio/visual presentations.

There currently exist several methods of presenting still frame audio/visual displays. For example, a slide show or film strip presentation utilizes an audio tone to advance the projector. This normally is a 50 Hertz tone recorded in the audio track and filtered out during playback. The visual frames must be imaged on the film in correct presentation order for a film strip. For a slide show, typical carousels have a limited number of slides which they may hold. This number is generally less than 140 slides.

It currently is also possible to compress a limited amount of audio onto a video frame. By current methods, this consists of about thirty seconds per frame. The audio is not of a quality acceptable, however, to most critical professionals and is further limited when going to stereo response. More importantly, "remastering" to add, delete, or modify audio or video is expensive and time consuming and video frames and audio must be recorded in sequential order.

Another currently available alternative is the utilization of a video tape source. A video tape source, however, has limited still frame capabilities and is not very stable in still frame mode. Consequently, a still frame is continuously recorded onto a free-running video tape. This allows for increased quality and duration of audio, but the video tape does not provide a stable image on commercial or industrial quality players and is objectionable to audio/visual professionals.

Several attempts have been made in the prior art to synchronize still frame audio and visual presentations. Ramag, U.S. Pat. No. 3,878,560, is typical of the prior art approach. This patent addresses the use of a single audio/video source which allows play of a single video frame while audio continues. The audio signal is sampled at a rate compatible with the video source and stored on the same media as the video source. The audio is limited to 8.5 seconds per frame, and is embedded in the video media. As a result, mastering of the audio also requires mastering of the video since a single playback device delivers both signals. Further, the audio is of a fixed length per frame and limited in the number of output channels. Still further, this device, and other devices like it, do not use existing equipment for information retrieval, but requires non-conventional devices for both storage and display. As the audio has been sampled, it, therefore, has a limited band width.

Other devices, such as Omori, U.S. Pat. No. 3,909,512, are concerned with a method of transmission of sound when a still frame video signal is also transmitted. In Omori, the sound is digitized and frequency modulated into the transmitted signal. The received signal is buffered in digital memory and the time base expanded as it is converted back into analog form.

More recent devices are designed to provide enhanced video editing apparatus. Menezes, U.S. Pat. No. 4,394,745, disclosed several complex schemes for editing existing video tapes. The key to Menezes is a means of locating the position on the tape when a person already knows the locating key associated with that area of the tape. Further, Menezes concerns itself with combining video sources onto a single receiver.

Thus, it can be seen that there are drawbacks to the present methods of still frame audio/visual presentations and attempts to alleviate these drawbacks known in the art. There is a need in the art, therefore, for providing an audio/videodisc synchronizer that synchronizes audio and video signals from different sources. Further, there is a need for a synchronizer that enables long playing audio to be synchronized with still frame video displays. Still further, there is a need for a noncomplex, nonexpensive means for accomplishing these objectives with utilization of conventionally available devices. It, therefore, is an object of this invention to provide an audio/videodisc synchronizer that provides virtually unlimited audio per video frame; provides for remastering of the audio program independent of the video source; that eliminates the need for video frames with audio to be recorded on the videodisc in the same sequential order in which they will be replayed; and which allows for selection of a variety of video frames, for use in preparing new presentations, simply, quickly and easily.

SHORT STATEMENT OF THE INVENTION

Accordingly, the audio/videodisc synchronizer of the present invention includes a videodisc player capable of playing a videodisc containing a compilation of a large number of discrete video images. The videodisc contains, or has available, an associated table for location of these images within the disc. A synchronizing device is connected to the videodisc which has the capability of communicating location ques with the videodisc player. The synchronizing device can also transmit the ques to one of a large number of tracks of a recording medium, such as magnetic tape. The synchronizing device is connected with an interface mechanism, such as a programmable microcomputer, so that individual ques, which are desired to be collected, may be picked from the que table and transmitted through the synchronizer to the magnetic tape on a tape recorder/player. As a result, from a tremendous number of individual images, a coherent, selected number of discrete video images can be arranged and rearranged at the users whim.

Synchronization of audio with the selected images is accomplished by means of connecting the tape recorder/player, known in the art, to the synchronizing device so that audio signals are added to one of the tracks of the recording media. Having recorded the audio, the synchronizer translates the computer signal for a desired que and corresponding video frame to an audio signal for recording on said tape. When the desired audio and ques have been recorded, playback of audio through a sound system and of video images from the synchronizer which retranslates the audio que signal to a computer que signal and send it to the videodisc player, results in substantially simultaneous audio/video still frame presentations. By this means then, from separate sources, virtually unlimited audio is possible per video frame. Further, by means of the present invention, remastering of the program audio may be accomplished independent of the video source. Importantly, the present invention eliminates the need that video frames with continuous audio be recorded on the videodisc in the same sequential order in which they will be replayed, as is now the state of the art.

Further, the invention allows for selection of a variety of video frames, for use in preparing new presentations, without the requirement of lengthy and expensive remastering of the entire videodisc. In this regard, the present invention allows the user to fully utilize the large storage potential of videodiscs, currently 54,000 frames per side, for smaller presentations by allowing the audio source to select the video frame to be viewed. This means that one videodisc can be used for the creation of hundreds of different video presentations and that the user can have many audio tapes corresponding to a single videodisc.

Still further, the present invention works with videodisc players and videodiscs that are standard in business and industry and known in the art. As a result, many users will find that they have enough video source already recorded to be able to generate presentations immediately with only in-house audio mastering costs. Additionally, the present invention works with almost any recordable audio source and sound system.

To reiterate the field of the invention, the present invention is concerned with the synchronization of still images with sound input. A videodisc and a compact disc player are two readily known commercially available devices for video and sound production. The videodisc has enormous potential for image storage, 54,000 frames per side on a twelve inch disc for instance. The cost per videodisc is very low, but the cost for mastering video and sound onto the disc is very expensive. Currently, once the sound is mastered onto a videodisc, the sound can only be changed by remastering.

The disc players, known in the art, have the ability to jump to any of the frames on the disc in under two seconds. There is no effective way, until now however, of combining the attributes of the videodisc and the audio tape player to create a free-running audio/video presentation. There is simply no available way of synchronizing a high quality external audio source with the images on the video disc.

The present invention synchronizes selected videodisc ques to any audio tape source, thereby allowing the user to combine top quality audio and video into a coherent presentation. With the availability of approximately 54,000 images per side, many presentations are contained on one disc and the user can easily master his own audio with conventional consumer equipment. As a result, this radically drops the price for using videodiscs in classrooms, point of sale presentations, or for any audio/visual presentations. Inevitably, this invention will expand the use of videodiscs as a presentation media.

BRIEF DESCRIPTION OF THE DRAWINGS

Other objects, features and advantages of the present invention will become more fully apparent from the following detailed description of the preferred embodiment, the appended claims and the accompanying drawings in which:

FIG. 5 is an internal block diagram of the synchronizer of the present invention.

DETAILED DESCRIPTION OF THE PREFERRED EMBODIMENT

Figure 1:
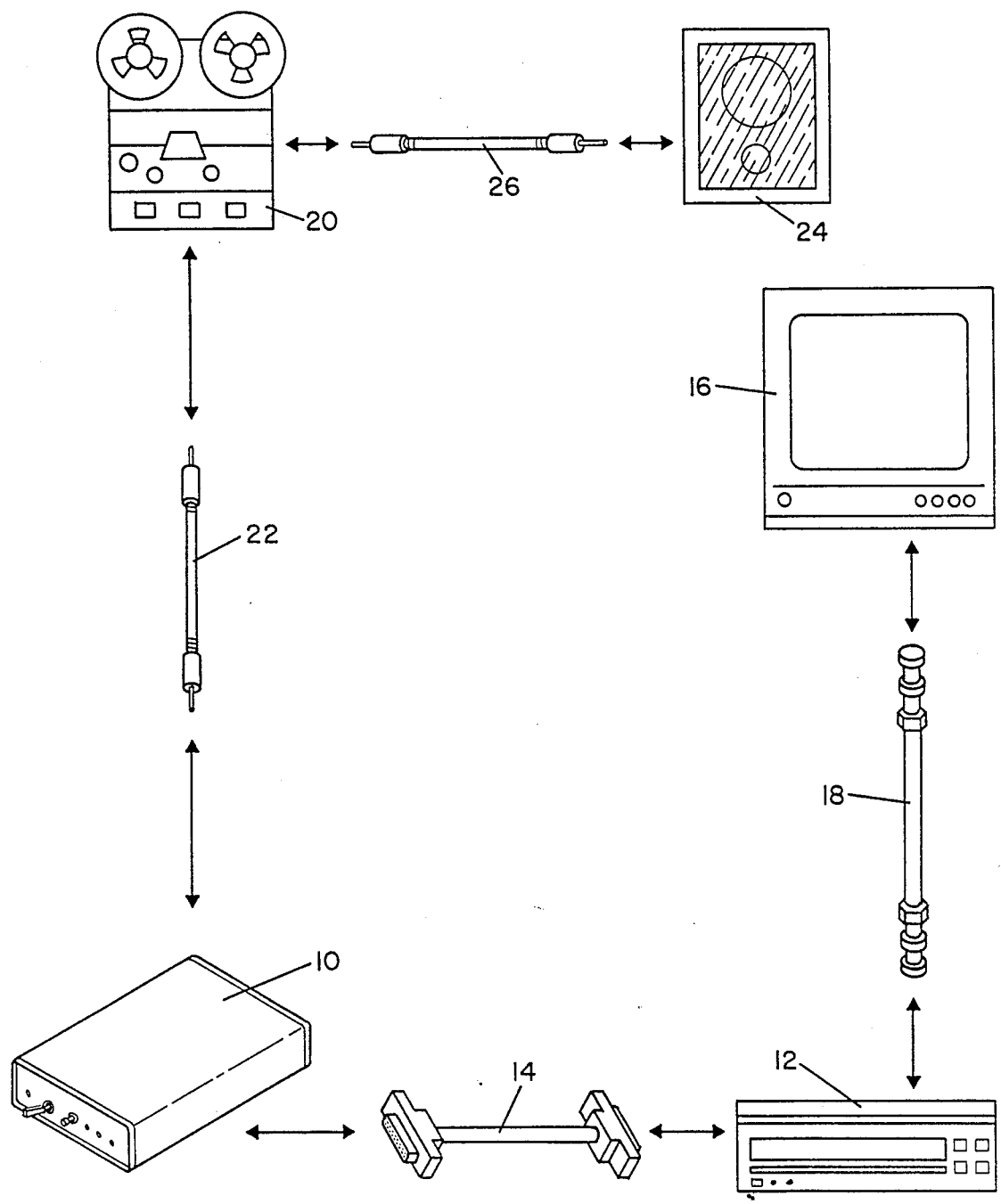
FIG. 1 is a connection diagram of the elements of a preferred embodiment of the audio/videodisc synchronizer of the present invention in the playback mode.

The preferred embodiment of the present invention is illustrated by way of example in FIGS. 1-5. With specific reference to FIG. 1, synchronizer 10 is shown connected to videodisc player 12 by means of connector 14. Connector 14 is a type known in the art and is conditioned to meet the requirements of the RS232 specifications so that the computer signal from videodisc player 12 can be transmitted to synchronizer 10 and vice versa. Videodisc player 12 is designed, as known in the art, to receive a previously recorded video disc (not shown), also known in the art, which, as previously discussed, can currently hold 54,000 individual pictures. Videodisc player 12 is connected to video monitor 16 by means of video connector 18, capable of transmitting signals from the player to the monitor for viewing. Video connector 18 is commonly known in the art and not discussed further herein.

FIG. 1 also illustrates the connection of synchronizer 10 with tape player/recorder 20. Synchronizer 10 and tape player/recorder 20 are connected by means of audio connector 22, known in the art and not discussed further herein, by means of which previously received and recorded que signals in audio form are transmitted from tape player/recorder 20 to synchronizer 10 wherein they are translated to computer signals which are transmitted to videodisc player 12 and the corresponding video frame is displayed on video monitor 16.

FIG. 1 further illustrates that the previously recorded audio track on tape player/recorder 20 is played through sound system 24 by means of audio connector 26. As a result, while the prerecorded sound is being transmitted through audio system 24, the prerecorded ques, synchronized with the sound, are being transmitted through synchronizer 10 and videodisc player 12 and corresponding video images are displayed substantially simultaneously on video monitor 16.

Figure 2:
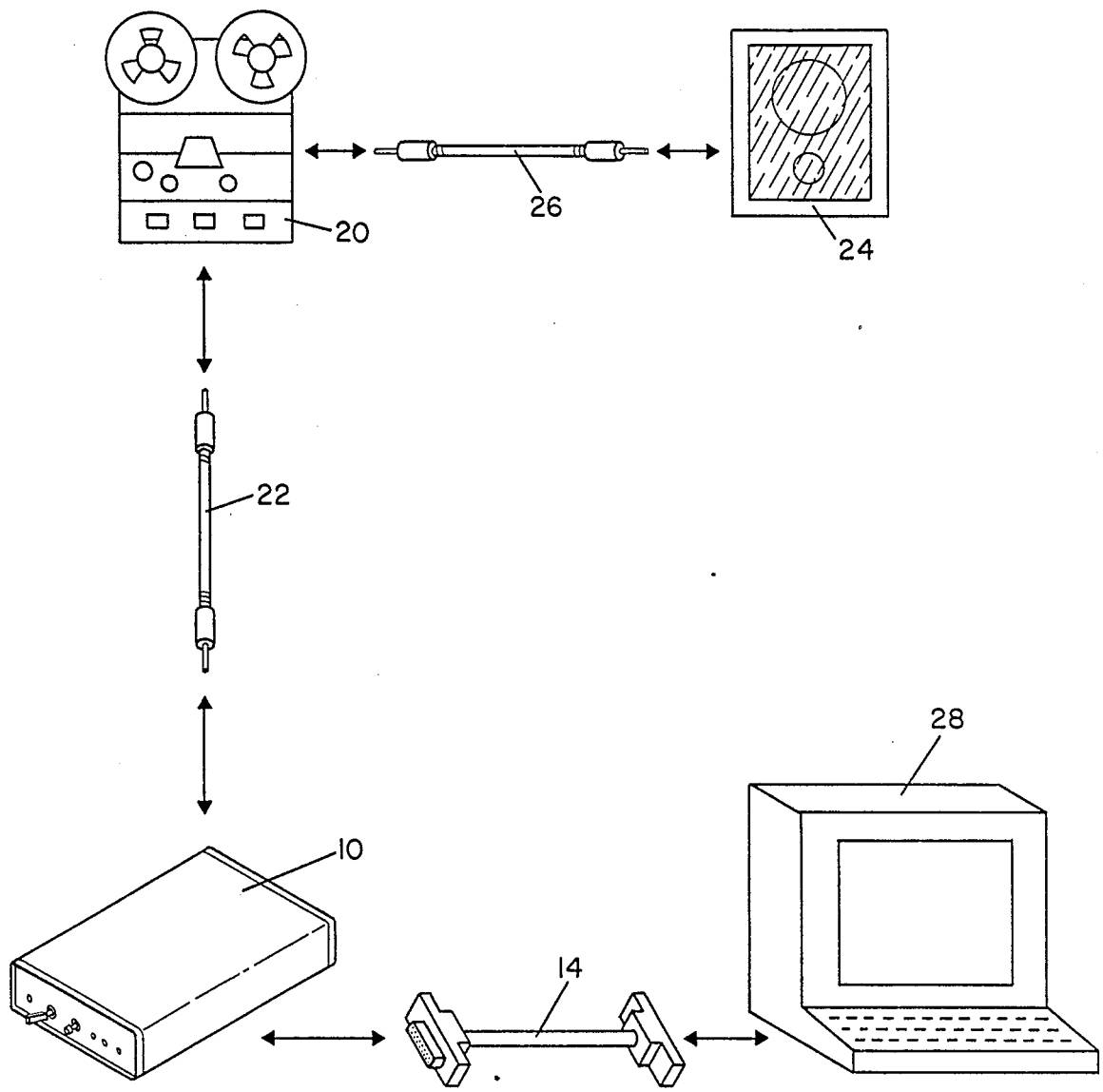
FIG. 2 is a diagram illustrating the present invention in the record mode.

Referring now to FIG. 2, a connection diagram illustrating the present invention in the record mode is demonstrated. In this mode, digital connector 14 is connected with computer interface 28. Computer interface 28 is comprised of a programmable computer of a type commonly known in the art, such as an IBM PC, and has the ability to store the maps to the ques for many videodiscs at one time. Obviously, computer interface 28 is a high performance, yet inexpensive interface device.

In the record mode illustrated in FIG. 2, computer interface 28 is used to select desired video ques from the que map for a particular videodisc and transmit them through connector 14 to synchronizer 10. Synchronizer 10 then translates the computer signal to an audio signal and transmits it through audio connector 22 to tape recorder/player 20. The user records these desired selected ques, by this means, on tape recorder/player 20, in synchronization with audio signals and the video que signals are then available for replay through a videodisc, as shown in FIG. 1.

Figure 3:
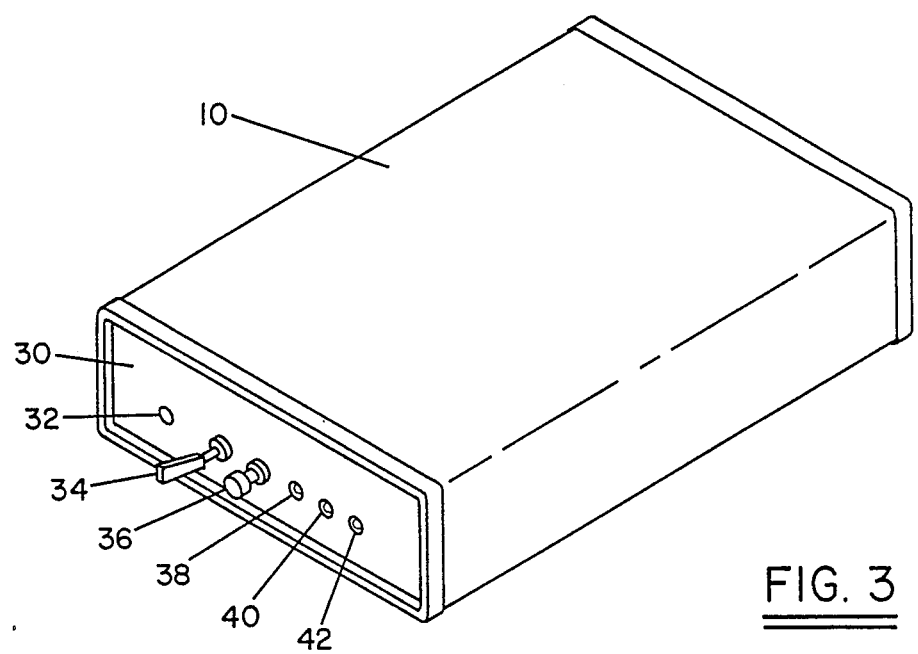
FIG. 3 is a front plan view of the synchronizer of the present invention.

Turning now to FIG. 3, a front view of synchronizer 10 is shown. From left to right on the face 30 of synchronizer 10 are shown manual que switch connection 32; play/record mode selector 34; and reset button 36. Also shown are three light emitting diodes; a trigger light 38; a valid light 40; and a que light 42.

Figure 4:
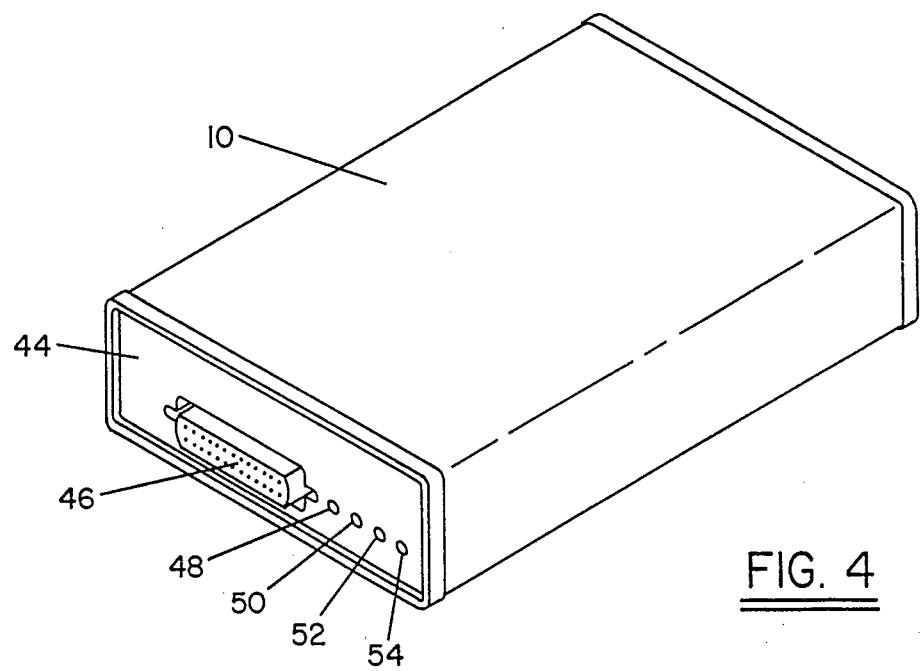
FIG. 4 is a rear plan view of the synchronizer of the present invention.

Referring now to FIG. 4, a rear view of synchronizer 10 is shown. Rear side 44 contains a standard 25 pin connector 46 (known in the art); ¼" jack out low and out high connections 48 and 50; ¼" audio jack input port 52; and nine volt dc power supply input 54.

Referring now to FIG. 5, an internal block diagram of synchronizer 10 is shown. Most of the internal control circuitry of synchronizer 10 is contained in its microcomputer 56. In its preferred embodiment, microcomputer 56 consists of a Z80 central processing unit (CPU) 58; a 27256 program memory (EPROM) 60; and 2 k bytes of alterable non-volatile memory (RAM) 62. Additionally, microcomputer 56 includes a clock and baud rate generator 64.

The basic unit has two serial ports 66 and 68. Serial port 66 is connected with RS232 signal conditioner 70 that enables synchronizer 10 to communicate with almost any computer, terminal, or modem 28 or videodisc 12. Serial port 68 has its input and output signals conditioned to be recorded and retrieved to and from conventional audio storage equipment such as magnetic tape, compact disc, etc. Signals received from audio player 20 through connection 52 are passed through amplifier, filter, clipper 72 to clock stripper circuit 74 to serial port 68. Audio signals from serial port 68 are passed through clock insert circuit 76 and filter attenuator 78 to port 50.

Nine volt dc power supply input 54 is regulated by power supply and conditioner 80 to five volts dc for internal use.

In operation, serial ports 66 and 68 each take a "byte" of data from microcomputer 56 and shift this data out a "bit" at a time with additional control bits. The input/output from port 66 is conditioned to RS232 specifications and will, therefore, interface with any standard equipment with an RS232 compatible port. The output from the second port is exclusive "or'd" with the baud rate clock 64 and then passively filtered by filter attenuator 78 to give an output that can be recorded on standard audio equipment. The input from connection 52 is actively amplified and filtered by amplifier filter and clipper 72 and has clock and data separated by clock stripper circuit 74 to provide a pure digital signal which can be shifted back into the serial port 68 and read from the microcomputer 56.

The general function of synchronizer 10 in the record mode is that the user will interact with synchronizer 10 through RS232 port 46, by means of computer interface 28, for instance, and instruct synchronizer 10 when to deliver que numbers to audio recording equipment, such as tape player 20, through synchronizer tape output ports 48 and/or 50. In the play mode, the general function of the invention is that the user will play a prerecorded audio signal through synchronizer tape input port 52 and synchronizer 10 will translate audio signal containing a selected que to a computer signal which commands videodisc player 12 through connection with RS232 port 46. That is, synchronizer 10 extracts the digital ques received from the audio signals on the prerecorded magnetic tape on tape player 20, translates them to computer signals and delivers the appropriate control codes to videodisc player 12. This, in turn, causes videodisc player 12 to search for the given frame associated with the que. In practice, if the frame numbers in the table are consecutive, the synchronizer will deliver the appropriate step commands (forward or reverse) instead of the search command. The videodisc player 12 typically responds faster to the step command and there is no between frame blanking.

As a result of the present invention, there are several options available for a user for recording the above described ques on the recording medium or magnetic tape. To begin with, with computer interface 28 connected to synchronizer 10, the user can interactively load the que table in memory. The memory is battery sustained as previously discussed. The user can then interactively position the ques on tape with either terminal or hand switch controls. Obviously, the que table could be dump loaded from a remote computer, as is known in the art, and the ques "synced" as discussed above.

Synchronizer 10 can also be set to "auto que" the memory table onto the audio tape, spaced by a programmable time delay provided by computer interface 28. The synchronizer 10 can also be completely controlled by a remote computer, such as computer interface 28 or some other more remote computer, thereby allowing the user to customize the interface to his needs.

Further, manual queing allows the user to drive the videodisc player 12 directly from synchronizer 10 without the use of magnetic tape. This enables the user to preview frames stored in synchronizer's 10 memory and, as an option, can be used to create an "electronic slide presentation".

It should be noted that if synchronizer 10 detects tape input while in the record mode, it will regenerate the incoming signals and output them to the tape output. This allows regeneration of the digital signals on the tape and is the preferred way to duplicate tapes.

In operation then, the audio/videodisc synchronizer of the present invention can be used with almost any type of tape deck for recording. If it is a deck that will play some channels while recording another (commonly called the synch track) it is easier to time the ques. If this type of deck is not available, then the final mix probably will have to have the audio source delivered "real time" to the recording deck while the synchronizer 10 delivers the digital track.

To set up the synchronizer 10 for recording, computer interface 28 is connected by means of digital connector 14 to digital I/0 connector 46 of synchronizer 10. Next, a nine volt dc power supply input, of common design known in the art and not shown herein, is connected to synchronizer 10 at power supply input 54. Next, output from synchronizer 10 is connected by means of audio connector 22 to tape recorder/player 20. Low and high outputs 48 and 50 deliver the same signal at different levels. Typically, low output 48 is used for line level inputs and high output 50 is used for synch track inputs. The user then places the play record switch 34 in the record mode and pushes the reset button 36. The trigger light 38, which gives a gross indication that a signal is present and the valid light 40, which indicates that the gross signal which is present is capable of interpretation, should be off during recording. If either is on, the procedure is to remove any cableing to synchronizer 10 input and push the reset button 36. Assuming that trigger and valid lights 38 and 40 are off, synchronizer 10 is now providing a synchronization signal to the magnetic tape and tape recording can be commenced.

As previously mentioned, there are several ways to create que numbers (videodisc frame numbers) for recording. One mode is to have the que number written down and manually type them in using interface 28. For example, the user would type the numbers 1234, and the letter "q" on computer interface 28 to store a que to instruct the videodisc player 12 to jump to frame 1234 at this point. The user can type the frame number, 1234 well ahead of time since synchronizer 10 only "dumps" the que buffer after it receives the letter "q". At that point, que light 42 will flash and the synchronizer 10 will send back a carriage return linefeed combination to computer interface 28. Que 1234 will then be translated into an audio signal and recorded where and when desired on the audio track by tape recorder/player 20.

In another mode, by means of alterable non-volatile memory (ram) 62 the user is able to load a battery backed up que table (of at least 200 ques), into memory. From there, the user is capable of editing the loaded table and utilizing a hand switch, not shown, connected to manual connection 32, computer interface 28, or internal processor 56 as a timer, to either record the ques onto the tape on tape player 20 or to preview them from videodisc 12 on video monitor 16. The hand switch (not shown) as previously stated, plugs into the manual socket connection 32 in the front face 30 of synchronizer 10. After setting the play/record selector 34 to the record position, the hand switch, when activated less than one second, advances one que. When held down for more than one second, the switch causes the synchronizer to reverse one que. By this means, the user can drive either the tape player 20 or the videodisc player 12.

It is understood that computer interface 28 provides interactive control and verification of ques as they are laid on magnetic tape of tape player 20. The internal auto timer may be utilized which automatically delivers a que every so many seconds to tape player 20 or videodisc 12.

In operation, when playing prerecorded ques from magnetic tape player 20 through synchronizer 10, the following procedure is utilized. First the user connects videodisc player 12 to synchronizer 10 by means of digital connector 14. Next, the user connects a power supply, of ordinary design, to synchronizer 10 at connection 54. Then the user connects the input connection 52 of synchronizer 10 to tape recorder/player 20 by means of audio connector 22. The user then places the play/record selector 34 in the play mode and pushes reset button 36. If the trigger and valid lights 38 and 40 flash, then videodisc player 12 has returned a "not ready" command. At this point, the user would check the video disc player status to determine that a disc was, in fact, inserted in the device and that it was otherwise ready to play. Once the device is ready, the user would then play the prerecorded magnetic tape on tape player 20. At this point, trigger light 38 will come on to indicate that a signal is being received. The valid light 40 will also come on if synchronizer 10 "recognizes" the signal on the tape as valid. Whenever a que is sent from the magnetic tape, the que light 42 will flash. At the same time que light 42 flashes, videodisc player 12 will seek the frame associated with that que and transmit the video image through video connector 18 to video monitor 16 where the video will be displayed in synchronized form with the audio delivered from sound system 24.

The synchronizer of the present invention can also be used for duplication of prerecorded audio and que signals. In the "duplication Mode" the user connects both tape input 48 or 50 and tape output 52 to the appropriate tape decks. Synchronizer 10 is then placed in a record position by moving play/record selector 34 to the record position. The user then pushes the reset button 36 and starts the "destination tape" recording. Next, the user starts the source tape to be copied, in the play mode. At this point, trigger light 38 will come on to indicate the a gross signal is being received. The valid light 40 will come on if the unit "recognizes" the signal of the tape. Que light 42 will flash each time a que is sent. Once the tape is finished, a duplicate of the prerecorded magnetic tape with audio and que signals will have been made.

In summary, the audio/videodisc synchronizer of the present invention accepts computer signals containing random access ques of a videodisc, translates these signals to audio signals and transmits those to a tape recorder/player for recording on a magnetic tape. The tape recorder preferably is capable of playing some channels while recording another. Having once recorded the audio desired and placed the ques in position on the audio tape where desired, a synchronized audio/videodisc presentation has been prepared. When the tape containing such presentation is played back from tape player to the synchronizer, the synchronizer translates the audio signal containing the que for a particular video frame into a computer signal, which is then transmitted to the videodisc player. Upon receipt of the que signal, the videodisc player jumps to the required frame and the frame is displayed on the video monitor substantially simultaneously with the audio on the magnetic tape.

While the present invention has been disclosed in connection with the preferred embodiment thereof it should be understood that there may be other embodiments which fall within the spirit and scope of the invention as defined by the following claims.

What is claimed is:

1. An apparatus for synchronizing audio signals and videodisc signals comprising:
   (a) a synchronizing means for translating computer signals containing que information into audio signals containing que information and for translating the audio signals containing que information into the computer signals containing que information;
   (b) a videodisc playing means, detachably connected to said synchronizing means, for playing a videodisc means containing a compilation of a plurality of discrete video images, upon receipt of said computer signals;
   (c) a video monitor means detachably connected to said videodisc playing means for visual display of said images from said videodisc means;
   (d) an audio player/recorder means detachably connected to said synchronizing means for receiving and recording said audio signals containing ques corresponding to selected images on said videodisc means from said synchronizing means for playing back said recorded audio signals containing que information to said synchronizing means; and
   (e) a sound system means connected to said audio player/recorder means for sound distribution of audio track signals from the player/recorder.

2. The apparatus of claim 1 wherein said synchronizing means further comprises:
   (a) a power supply and conditioning means for receiving electrical power;

(b) a microcomputer means for storage and processing of said computer and audio signals containing que information;
(c) audio output translating means for translating said audio signals containing que information into audio signals containing que information;
(d) audio input translating means for translating said audio signals containing que information received from the audio player/recorder means into computer signals containing que information;
(e) a play/record mode selecting means for selecting either a play mode or a record mode;
(f) a trigger indicating means for indicating when a signal is being received from the audio player/recorder means;
(g) a valid signal indicating means for indicating that said signal from the audio player/recorder means is valid; and
(h) a que signal indicating means for indicating that a video disc que is being transmitted from the synchronizer means to the videodisc playing means.

3. The apparatus of claim 2 further comprising an interface means connected to said synchronizing means capable of storing entire que maps of videodiscs so that computer signals for selected ques are transmitted to said synchronizing means in a selected order.

4. The apparatus of claim 3 further comprising a manual que means whereby said ques stored in said microcomputer, are translated and, as desired, sent to said tape player/recorder means for recording or to said videodisc means for viewing an image corresponding to said que on said video monitor means.

5. A method of synchronizing audio played from a suitable audio signal recording medium having at least two recording tracks for recording at least two separate audio signals, with still frame video images recorded at discrete and individually qued locations on a suitable video recording medium, said method including the steps of:
(a) translating a desired video image que signal to an audio que signal capable of being recorded on one track of the audio signal recording medium by a suitable audio recorder adapted to record audio signals onto one track of the audio signal recording medium;
(b) recording the translated audio que signal at a desired location on one track of the audio signal recording medium coinciding with a primary audio signal recorded on at least one other track on the audio signal recording medium;
(c) playing the audio signal recording medium on a suitable audio player;
(d) directing the primary audio signals to a suitable sound system for acoustic reproduction of the recorded sounds;
(e) translating the audio que signal to the video image que signal;
(f) directing the video image que signal to a video player suitable for playing the qued video frame from the video recording medium in response to the video image que signal; and
(g) displaying the qued video frame on a suitable video monitor substantially simultaneously with the acoustic reproduction of the primary audio signals.

6. The method of claim 5 including the step of entering each video image que to be translated to an audio que signal through a digital computer interface.

7. The method of claim 5 including the step of entering each video image que to be translated to an audio que signal from a synchronizing device memory with a manual control switch.

8. The method of claim 5 wherein the video recording medium is a suitable videodisc and the video player is a suitable videodisc player.

9. The method of claim 5 wherein the primary audio signals and the audio que signal are recorded simultaneously.

10. The method of claim 5 wherein the primary audio signals are pre-recorded on the audio signal recording medium and including the step of playing the pre-recorded audio signals while recording each audio que signal.

11. The method of claim 5 including the steps of:
(a) producing a trigger indication when the audio que signal is being translated to the video image que signal;
(b) producing a valid signal indication when the audio que signal being translated to the video image que signal is valid; and
(c) producing a que signal indication when the video image que signal is being directed to the video player.

12. The method of claim 5 including the step of determining the location at which the audio que signal is recorded on the audio signal recording medium according to a predetermined time delay.

* * * * *